United States Patent
Kim et al.

(10) Patent No.: US 11,184,846 B2
(45) Date of Patent: Nov. 23, 2021

(54) METHOD FOR TRANSMITTING OR RECEIVING FRAME IN WIRELESS LAN, AND APPARATUS THEREFOR

(71) Applicant: LG Electronics Inc., Seoul (KR)

(72) Inventors: Jeongki Kim, Seoul (KR); Kiseon Ryu, Seoul (KR); Suhwook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/634,807

(22) PCT Filed: Jul. 25, 2018

(86) PCT No.: PCT/KR2018/008426
§ 371 (c)(1),
(2) Date: Jan. 28, 2020

(87) PCT Pub. No.: WO2019/022507
PCT Pub. Date: Jan. 31, 2019

(65) Prior Publication Data
US 2021/0099951 A1 Apr. 1, 2021

Related U.S. Application Data

(60) Provisional application No. 62/537,973, filed on Jul. 28, 2017.

(51) Int. Cl.
*H04W 52/02* (2009.01)
*H04W 28/02* (2009.01)
(Continued)

(52) U.S. Cl.
CPC ... *H04W 52/0206* (2013.01); *H04W 28/0268* (2013.01); *H04W 40/244* (2013.01); *H04W 84/12* (2013.01)

(58) Field of Classification Search
CPC ....... H04W 28/18; H04W 52/02; Y02D 30/70
See application file for complete search history.

(56) References Cited

U.S. PATENT DOCUMENTS 10,433,253 B2 * 10/2019 Huang ............. H04W 52/0229
10,499,335 B2 * 12/2019 Huang ............. H04W 52/0216
(Continued)

FOREIGN PATENT DOCUMENTS

KR  20110069671  6/2011
KR  20140053857  5/2014
(Continued)

*Primary Examiner* — Nathan S Taylor
(74) *Attorney, Agent, or Firm* — Fish & Richardson P.C.

(57) ABSTRACT

A method for receiving a frame by a station (STA) in a wireless LAN (WLAN) according to the present embodiment: performing a wake-up radio (WUR) negotiation procedure for exchanging WUR operation parameters with an access point (AP) through a primary connectivity radio (PCR); entering a WUR mode; and waking up when a WUR frame is received through a WUR and monitoring a beacon frame through the PCR from the next beacon transmission timing, the WUR operation parameters exchanged through the WUR negotiation procedure include first time information indicating a time for which the STA that has woke up upon reception of the WUR frame needs to monitor the beacon frame from the next beacon transmission timing, and the STA can return to the WUR mode when the beacon frame is not received until the time indicated by the first time information has elapsed.

10 Claims, 19 Drawing Sheets

(51) Int. Cl.
*H04W 40/24* (2009.01)
*H04W 84/12* (2009.01)

(56) References Cited

U.S. PATENT DOCUMENTS

| | | | | |
|---|---|---|---|---|
| 2012/0230236 | A1* | 9/2012 | Kert | H04M 1/2535 |
| | | | | 370/311 |
| 2014/0177501 | A1* | 6/2014 | Seok | H04W 52/0216 |
| | | | | 370/311 |
| 2014/0241226 | A1* | 8/2014 | Jia | H04W 52/0229 |
| | | | | 370/311 |
| 2015/0245282 | A1* | 8/2015 | Kim | H04W 48/20 |
| | | | | 370/338 |
| 2015/0282157 | A1* | 10/2015 | Kim | H04W 48/14 |
| | | | | 370/329 |
| 2019/0230581 | A1* | 7/2019 | Hwang | H04W 48/10 |
| 2020/0045636 | A1* | 2/2020 | Huang | H04L 49/90 |
| 2020/0163021 | A1* | 5/2020 | Kim | H04W 52/02 |
| 2020/0178171 | A1* | 6/2020 | Lou | H04W 52/0225 |
| 2020/0196241 | A1* | 6/2020 | Lou | H04W 52/028 |
| 2020/0236624 | A1* | 7/2020 | Kim | H04W 76/28 |
| 2020/0245137 | A1* | 7/2020 | Chitrakar | H04W 12/04 |

FOREIGN PATENT DOCUMENTS

| | | |
|---|---|---|
| KR | 20140054071 | 5/2014 |
| KR | 20150068378 | 6/2015 |
| KR | 20150121168 | 10/2015 |

\* cited by examiner (a)

(b)

(a)

(b)

METHOD FOR TRANSMITTING OR RECEIVING FRAME IN WIRELESS LAN, AND APPARATUS THEREFOR

CROSS-REFERENCE TO RELATED APPLICATIONS

This application is a National Stage application under 35 U.S.C. § 371 of International Application No. PCT/KR2018/008426, filed on Jul. 25, 2018, which claims the benefit of U.S. Provisional Application No. 62/537,973 filed on Jul. 28, 2017. The disclosures of the prior applications are incorporated by reference in their entirety.

BACKGROUND

Field

The present disclosure relates to a wireless LAN and, more specifically, to a method for transmitting or receiving a frame through a wake-up ratio (WUR) or a primary connectivity radio (PCR) and an apparatus therefor.

Related Art

IEEE (Institute of Electrical and Electronics Engineers) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802. 11ac which supports eight spatial streams to support up to 1 Gbit/s is under discussion.

SUMMARY

An object of the present disclosure is to provide a method and apparatus for solving problems generated when a station (STA) which attempts to wake up according to reception of a broadcast wake-up frame and update PCR system information does not receive a beacon frame.

The present disclosure is not limited to the aforementioned technical task and other technical tasks can be inferred from embodiments of the present disclosure.

To accomplish the object, a method for receiving a frame by a station (STA) in a wireless LAN (WLAN) according to one aspect of the present disclosure includes: performing a wake-up radio (WUR) negotiation procedure for exchanging WUR operation parameters with an access point (AP) through a primary connectivity radio (PCR); entering a WUR mode; and waking up when a WUR frame is received through a WUR and monitoring a beacon frame through the PCR from the next beacon transmission timing, wherein the WUR operation parameters exchanged through the WUR negotiation procedure include first time information indicating a time for which the STA that has woke up upon reception of the WUR frame needs to monitor the beacon frame from the next beacon transmission timing, wherein the STA returns to the WUR mode when the beacon frame is not received until the time indicated by the first time information has elapsed.

To accomplish the object, a station (STA) according to another aspect of the present disclosure includes: a primary connectivity radio (PCR) transceiver; a wake-up radio (WUR) receiver; and a processor configured to perform a WUR negotiation procedure for exchanging WUR operation parameters with an access point (AP) through the PCR transceiver, to enter a WUR mode and monitor a WUR frame through the WUR receiver, and to wake up when the WUR frame is received and monitor a beacon frame through the PCR transceiver from the next beacon transmission timing, wherein the WUR operation parameters exchanged through the WUR negotiation procedure include first time information indicating a time for which the STA that has woke up upon reception of the WUR frame needs to monitor the beacon frame from the next beacon transmission timing, wherein the processor returns to the WUR mode when the beacon frame is not received until the time indicated by the first time information has elapsed.

The WUR frame may be a broadcast wake-up frame for instructing the STA to wake up to receive the beacon frame including PCR system parameters.

The STA may update PCR system parameters on the basis of the beacon frame when the beacon frame is received before the elapse of the time indicated by the first time information.

The WUR operation parameters exchanged through the WUR negotiation procedure may further include second time information.

The STA may transmit a PCR frame to the AP when a time indicated by the second time information has elapsed before the elapse of the time indicated by the first time information.

The PCR frame may be a PS-poll frame or a QoS null frame for notifying the AP that the STA has woke up.

The STA may not return to the WUR mode and may reattempt to receive the beacon frame even when the time indicated by the first time information has elapsed when the PCR frame has been successfully transmitted.

The STA may determine that the PCR frame has been successfully transmitted when an ACK frame is received from the AP after a short inter-frame space (SIFS) from transmission of the PCR frame.

The PCR frame may be a system parameter request frame for requesting PCR system parameters from the AP and include version information of PCR system parameters of the STA.

According to an embodiment of the present disclosure, a time for which an STA needs to wait in a PCR in order to receive a beacon after broadcast wake-up is defined in a WUR negotiation procedure and thus ambiguity and power waste occurring when the STA fails to receive a beacon in the PCR can be minimized.

Technical effects in addition to the above-described technical effect can be inferred from embodiments of the present disclosure.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
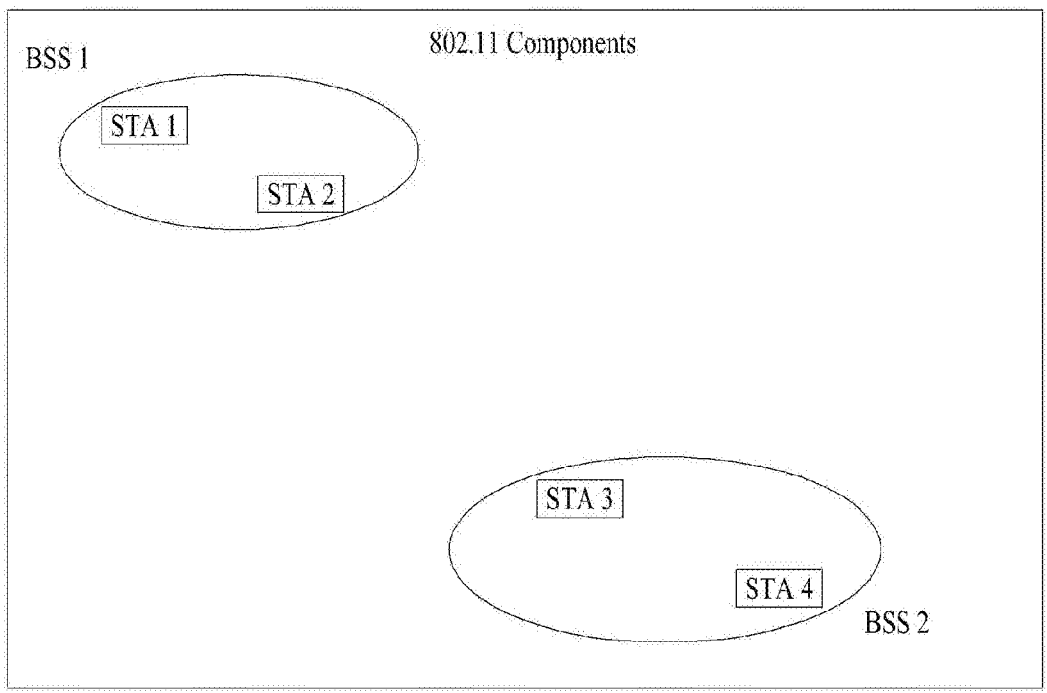
FIG. 1 is a diagram showing an example of a configuration of a wireless LAN system.

FIG. 1 is a diagram showing an example of a configuration of a wireless LAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
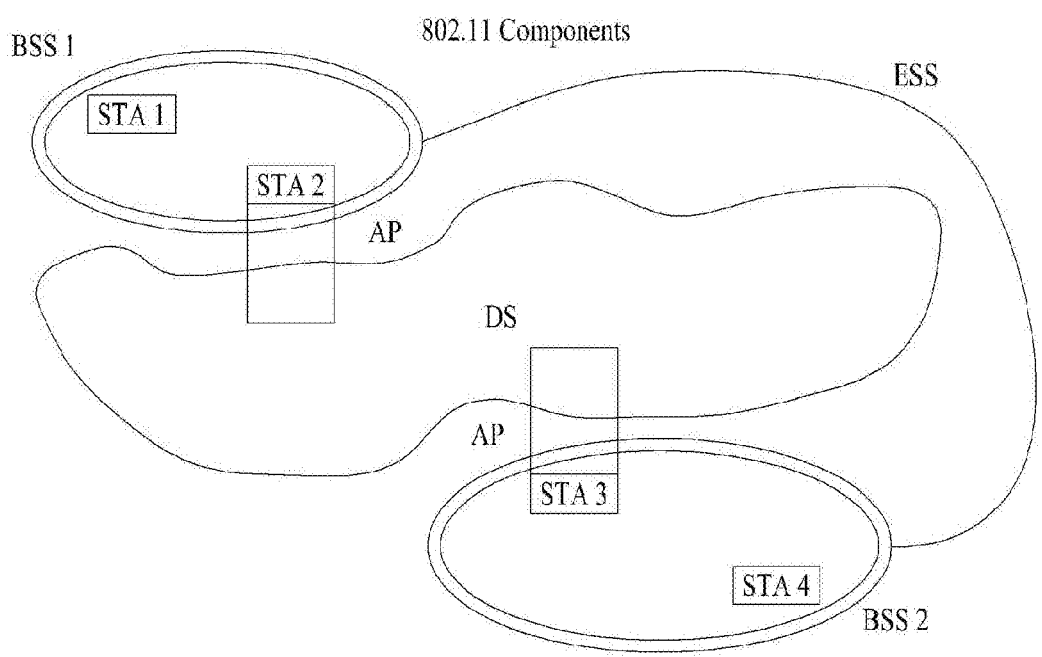
FIG. 2 is a diagram showing another example of a configuration of a wireless LAN system.

FIG. 2 is a diagram illustrating another example of a configuration of a wireless LAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET-.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
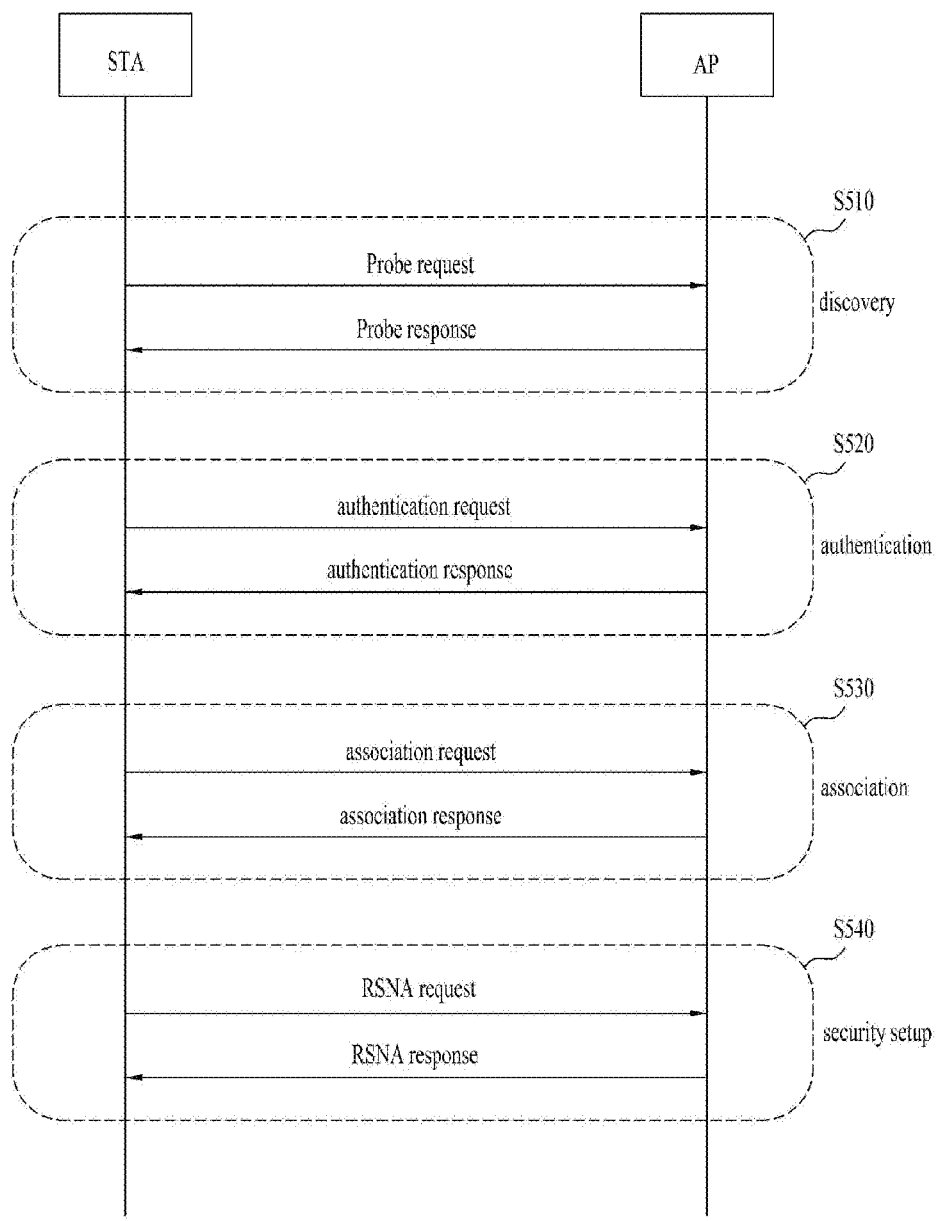
FIG. 3 is a diagram for explaining a general link setup process.

FIG. 3 is a diagram illustrating a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 4:
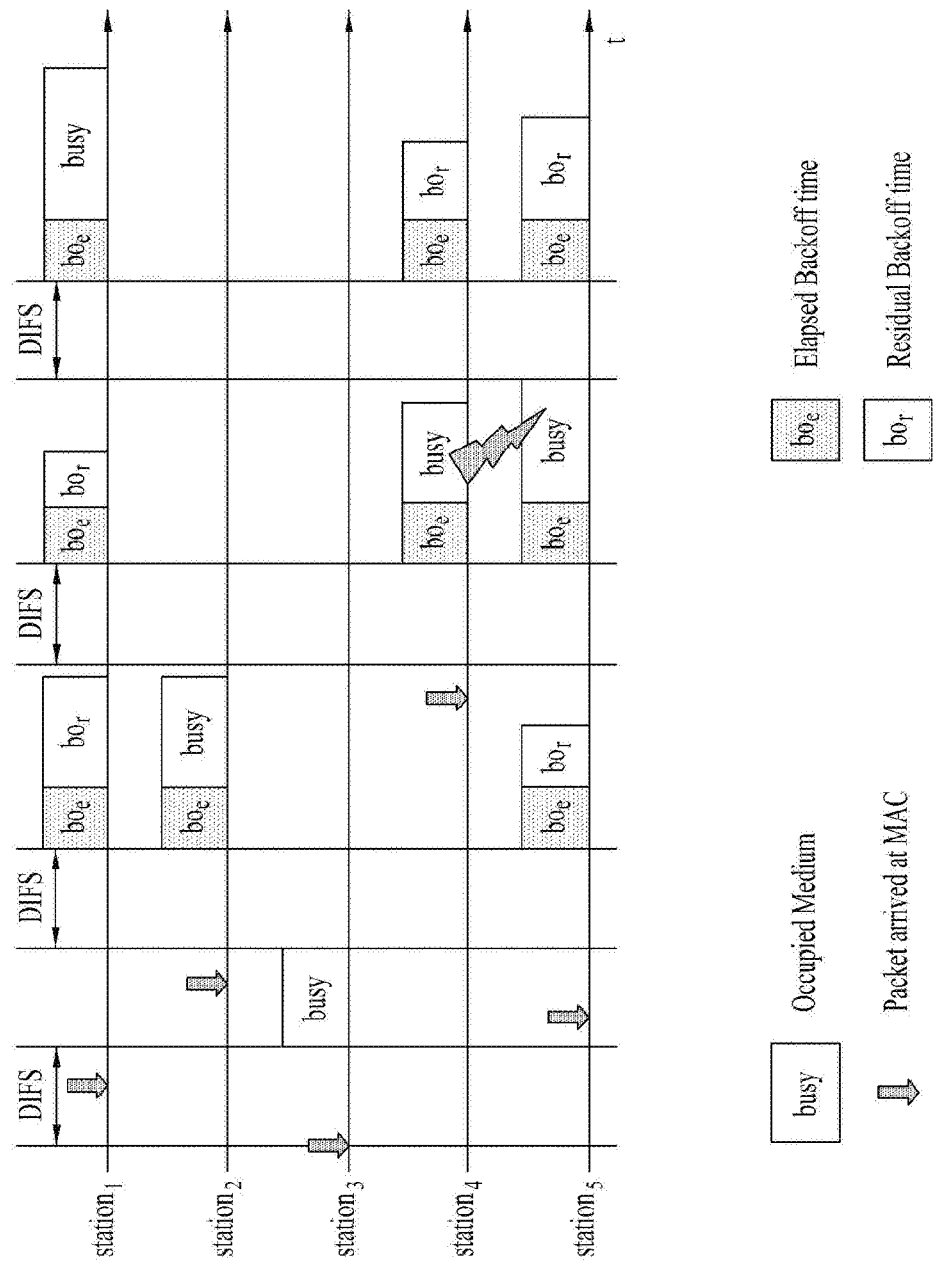
FIG. 4 is a diagram for explaining a backoff process.

FIG. 4 is a diagram illustrating a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2n-1$ ($n=0, 1, 2, \ldots$).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
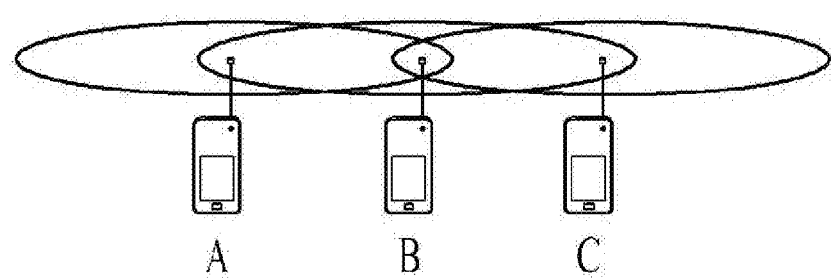
FIG. 5 is a diagram for explaining a hidden node and an exposed node.
Figure 5:
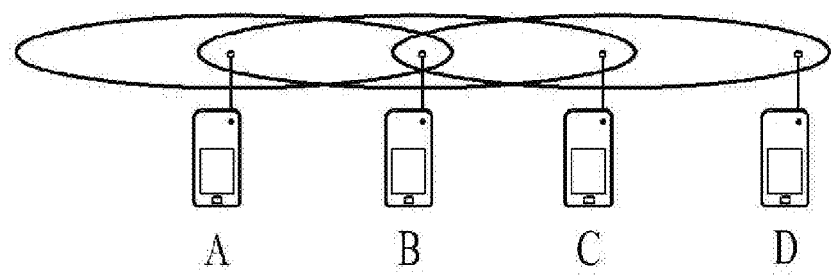

FIG. 5 is a diagram illustrating a hidden node and an exposed node.

FIG. 5(a) shows a hidden node, and, in this case, an STA A and an STAB are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STAB may not collide from the viewpoint of the STA A. Therefore, the STA C unnecessarily waits until transmission of the STA B is stopped. At this time, the STA C may be an exposed node of the STAB.

Figure 6:
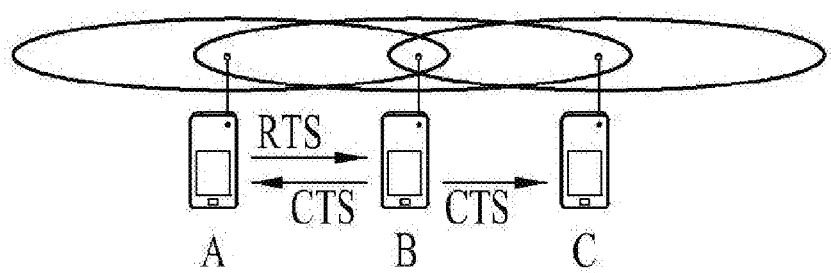
FIG. 6 is a diagram for explaining RTS and CTS.
Figure 6:
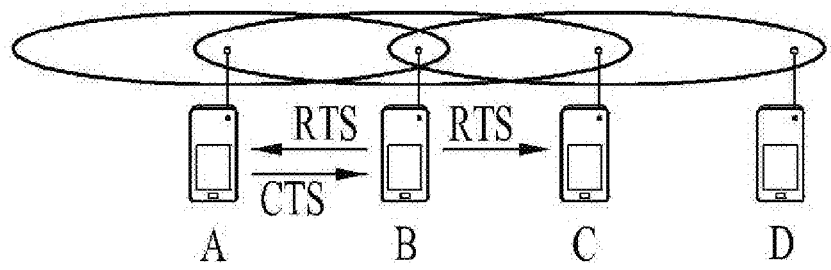

FIG. 6 is a diagram illustrating RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STAB. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
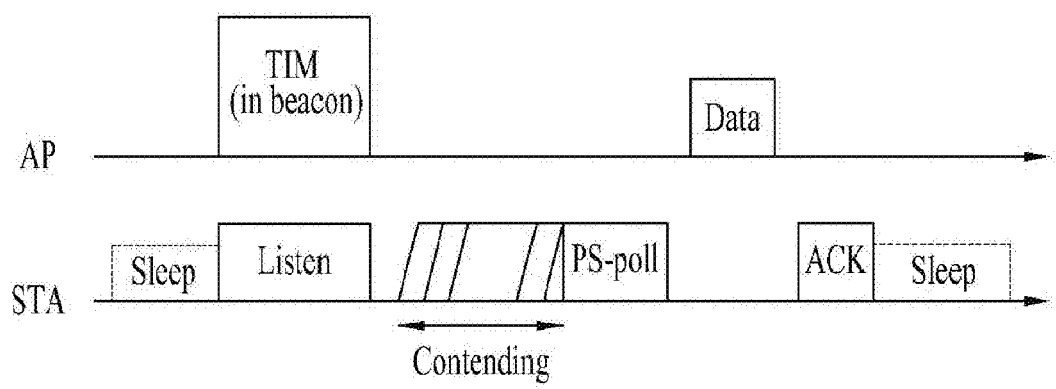
FIGS. 7 to 9 are diagrams for explaining an operation of an STA which receives a TIM.
Figure 8:
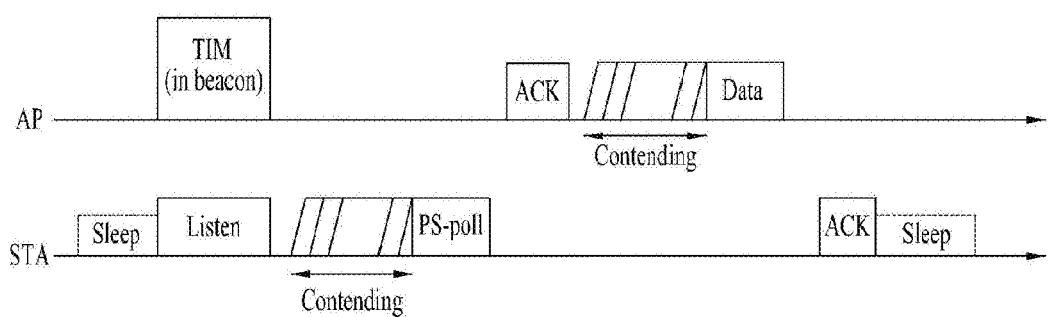
Figure 9:
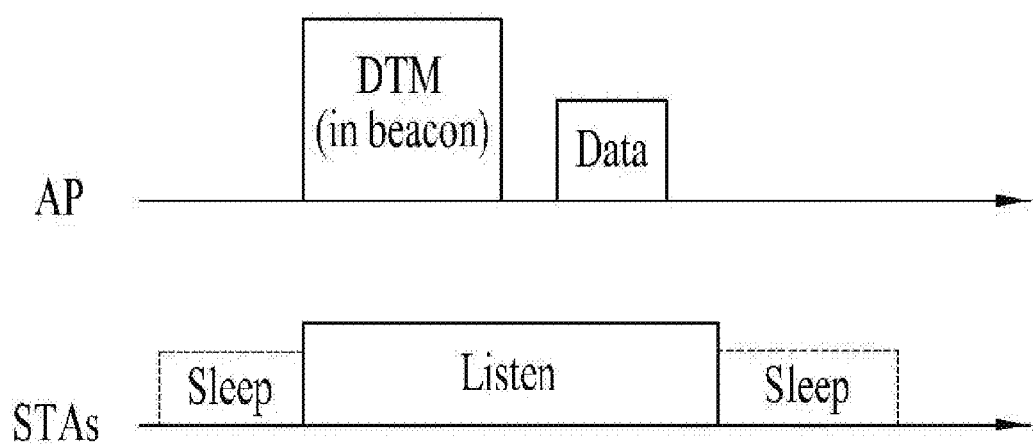

FIGS. 7 to 9 are diagrams illustrating an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
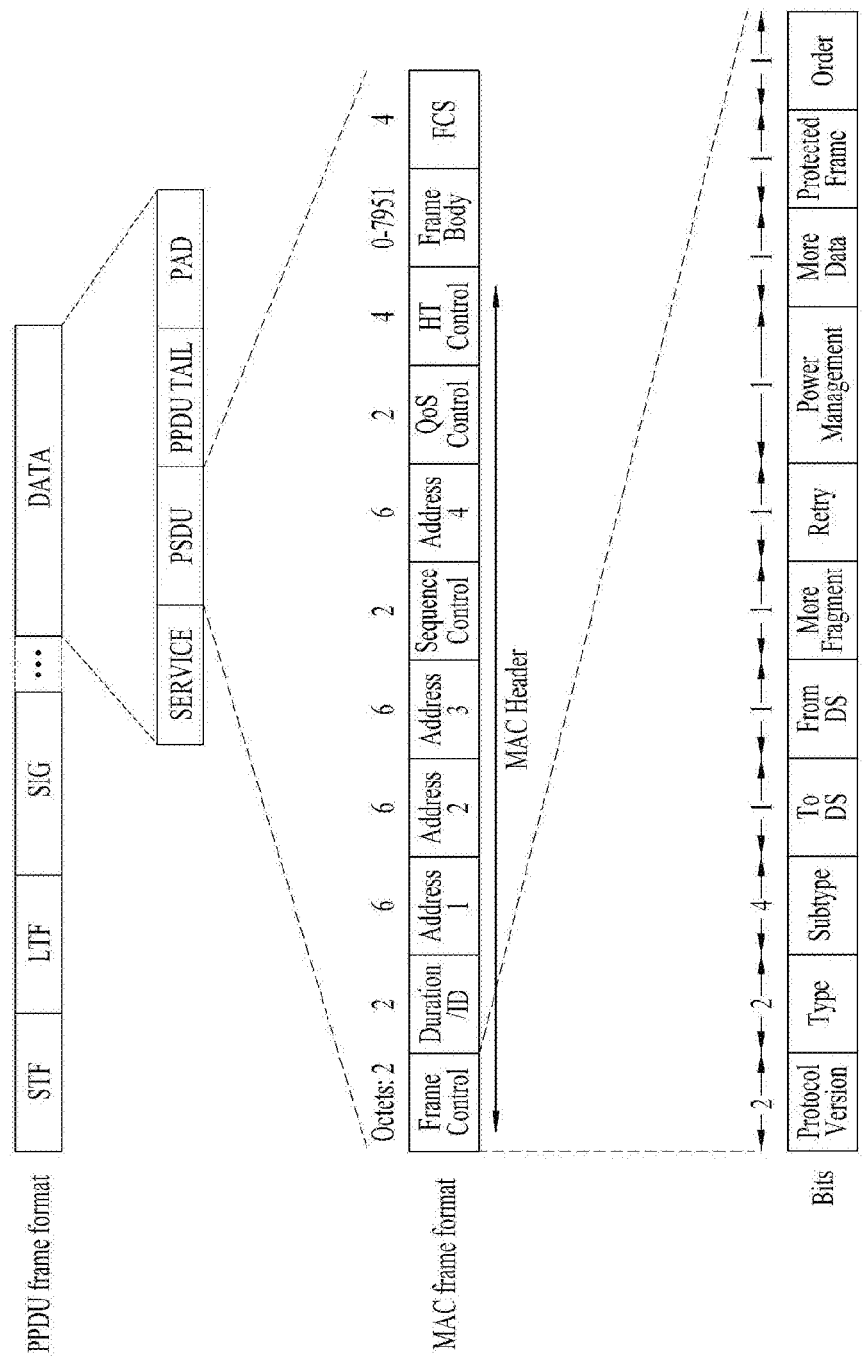
FIG. 10 is a diagram for explaining an example of a frame structure used in the IEEE 802.11 system.

FIG. 10 is a diagram illustrating an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (µs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

WUR (Wake-Up Radio)

First, a wake-up radio receiver (WURx) compatible with a WLAN system (e.g., 802.11) will be described with reference to FIG. 11.

Figure 11:
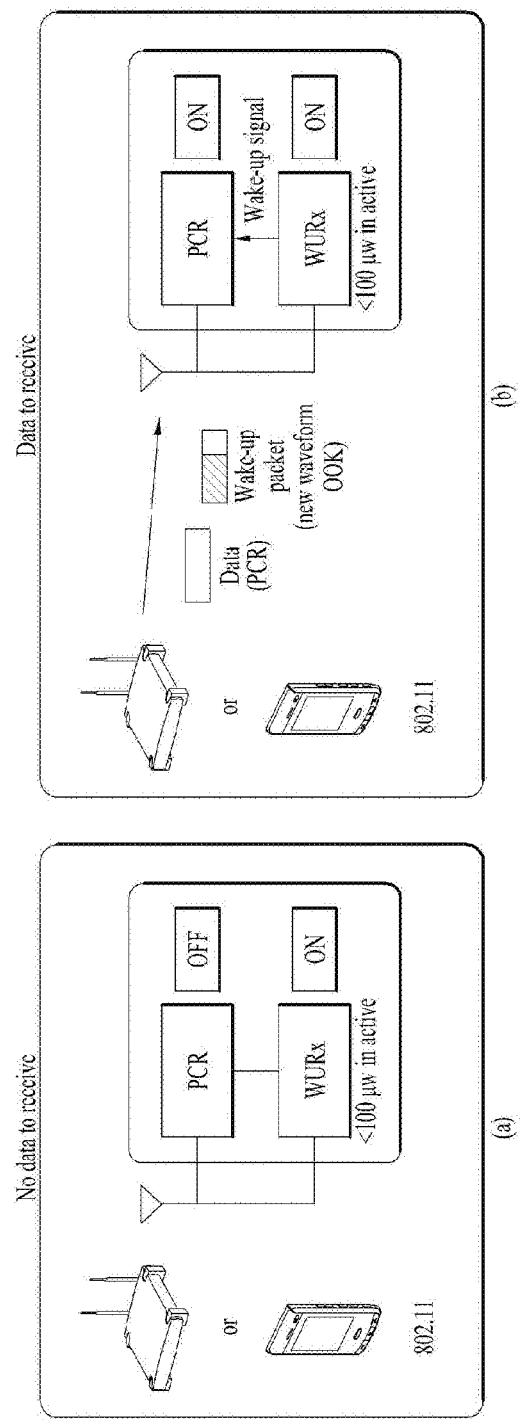
FIG. 11 is a diagram for explaining a WUR receiver that can be used in a wireless LAN system (e.g., 802.11).

Referring to FIG. 11, an STA may support primary connectivity radio (PCR) (e.g., IEEE 802.11a/b/g/n/ac/ax WLAN) and wake-up radio (WUR) (e.g., IEEE 802.11ba) for main wireless communication.

The PCR is used for data transmission and reception and may be turned off if there is no data to be transmitted/received. When the PCR is turned off, the WURx of the STA may wake up the PCR if there is a packet to be received. Accordingly, user data is transmitted and received through the PCR.

The WURx is not used for user data and may serve to wake a PCR transceiver up. The WURx may be a simple receiver that does not have a transmitter and is enabled while the PCR is turned off. It is desirable that target power consumption of the WURx do not exceed 100 microwatt (µW) in an enabled state. For such low-power operation, a simple modulation method, for example, on-off keying (OOK) may be used and a narrow bandwidth (e.g., 4 MHz or 5 MHz) may be used. A target reception range (e.g., distance) of the WURx may correspond to the current standard of IEEE 802.11.

Figure 12:
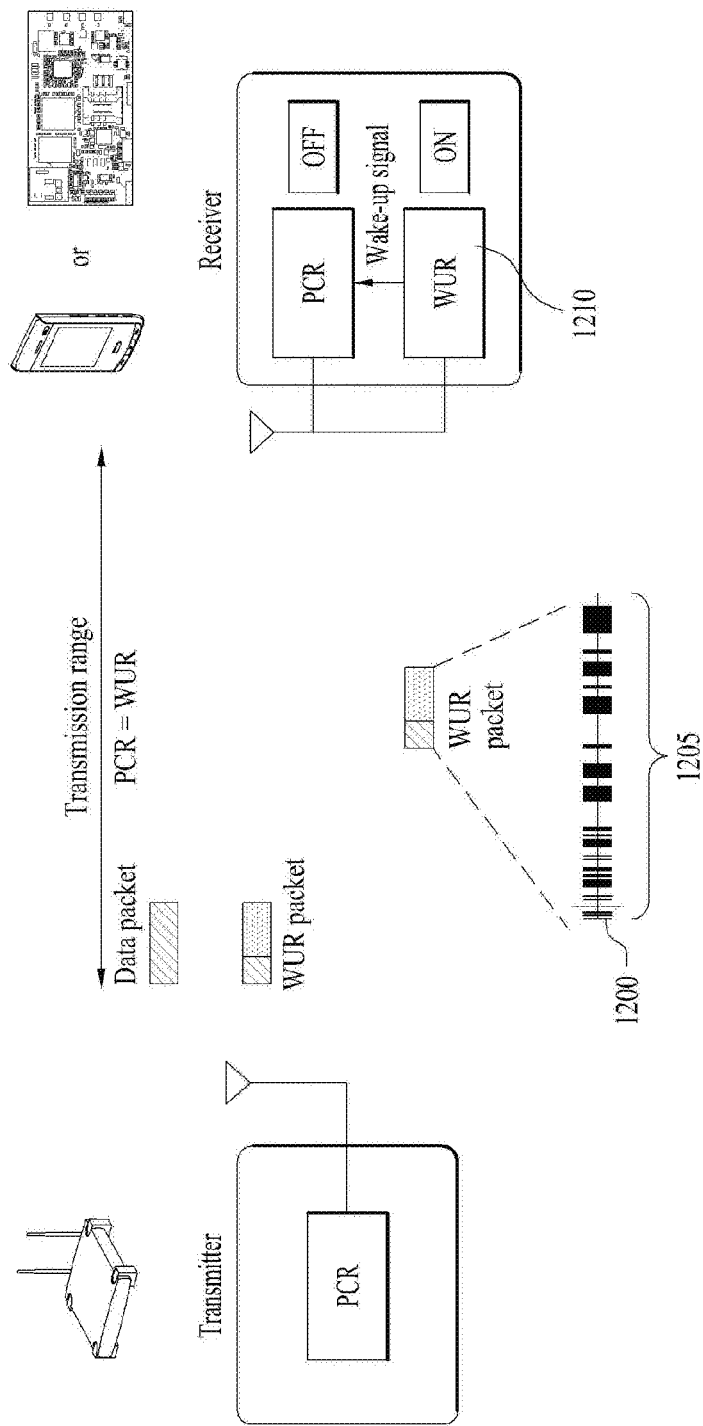
FIG. 12 is a diagram for explaining a WUR receiver operation.

FIG. 12 is a diagram for explaining design and operation of a WUR packet.

Referring to FIG. 12, the WUR packet may include a PCR part 1200 and a WUR part 1205.

The PCR part 1200 is for coexistence with a legacy wireless LAN system and may also be called a wireless LAN preamble (e.g., 20 MHz non-HT preamble). At least one of L-STF, L-LTF and L-SIG of the legacy wireless LAN may be included in the PCR part 1200 in order to protect the WUR packet from other PCR STAs. Accordingly, a 3rd party legacy STA can ascertain that the WUR packet is not intended therefor and a medium of PCR has been occupied by another STA through the PCR part 1200. A WURx does not decode the PCR part of the WUR packet because the WURx supporting narrow bands and OOK demodulation does not support PCR signal reception. A 1 BPSK symbol having a tone interval of 312.5 kHz and a duration of 4 µs is transmitted immediately after the L-SIG field.

At least a part of the WUR part 1205 may be a part modulated according to on-off keying (OOK). For example, the WUR part may include a WUR synchronization field and a WUR data field (e.g., WUR MAC frame). The WUR data field may include at least one of a MAC header (e.g., receiver address and the like), a frame body, and a frame check sequence (FCS). Meanwhile, OOK modulation may be performed by modifying an OFDM transmitter.

The WUR synchronization field of the WUR part may also be called a preamble. For example, the preamble of the WUR part and the 20 MHz non-HT preamble of the PCR part may be collectively called a WUR preamble. The preamble of the WUR part may include a WUR synchronization sequence. The duration of the WUR synchronization sequence may vary according to a data rate applied to the WUR data field. Accordingly, the data rate may be indicated by the WUR synchronization sequence. The WUR synchronization sequence may be set to 128 μs in the case of a low data rate (e.g., 62.6 kbps) and set to 64 μs in the case of a high data rate (e.g., 250 kbps). A synchronization sequence of 64 μs corresponds to a 32-bit binary sequence S. Here, 1 bit corresponds to 2 μs. A synchronization sequence of 128 μs corresponds to a combination of the binary sequence S and a complementary sequence S* of the binary sequence S.

A WURx 1210 can be realized by a small and simple OOK demodulator which consumes very low power of less than 100 μW, as described above.

In this manner, a WUR packet needs to be designed to be compatible in wireless LAN systems and thus it may include a legacy wireless LAN preamble (e.g., OFDM) and a new LP-WUR signal waveforms (e.g., OOK).

Figure 13:
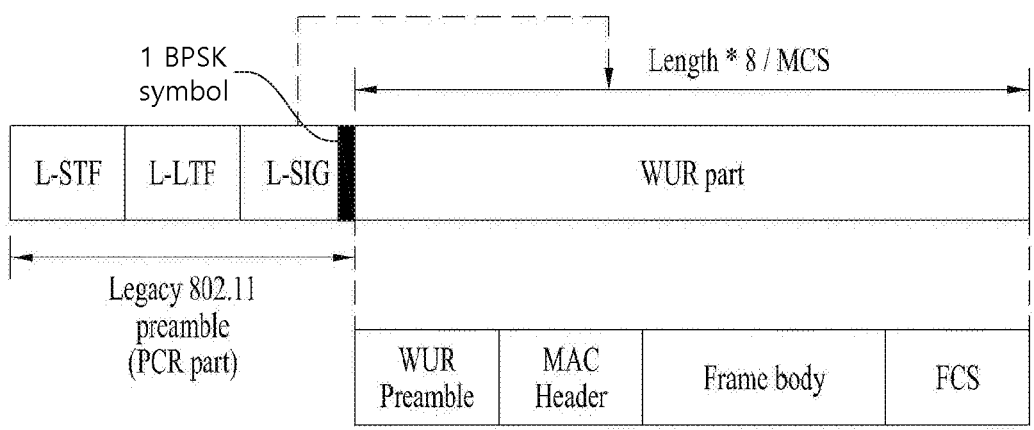
FIG. 13 illustrates an example of a WUR packet.

FIG. 13 illustrates an example of a WUR packet. The WUR packet in FIG. 13 includes a PCR part (e.g., legacy wireless LAN preamble) for coexistence with legacy STAs.

Referring to FIG. 13, the legacy wireless LAN preamble may include L-STF, L-LTF and L-SIG. Further, a wireless LAN STA (e.g., 3rd party) may detect the end of the WUR packet through L-SIG. For example, the L-SIG field can indicate the length of a payload (e.g., OOK-modulated) of the WUR packet.

A WUR part may include at least one of a WUR synchronization field, a MAC header, a frame body and an FCS. The WUR synchronization field may include, for example, a PN sequence (e.g., the aforementioned 32-bit binary sequence S or S+S*). The MAC header may include an address field (e.g., a transmitter address and/or a receiver address). The frame body may include other pieces of information necessary for wake-up. The FCS may include a cyclic redundancy check.

Figure 14:
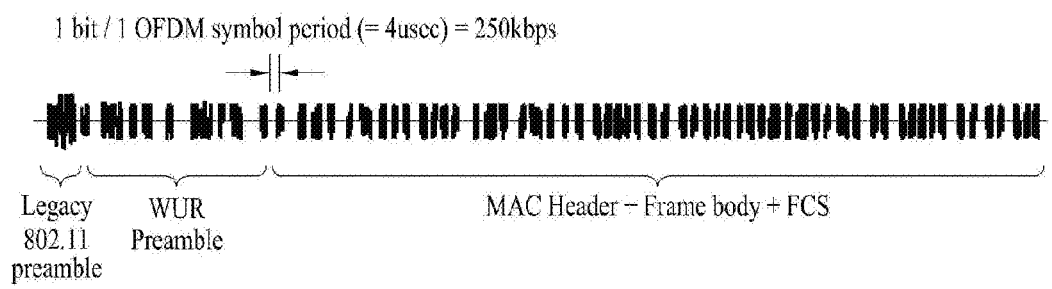
FIG. 14 illustrates waveforms of a WUR packet.

FIG. 14 illustrates waveforms with respect to the WUR packet of FIG. 13. Referring to FIG. 14, 1 bit can be transmitted per OFDM symbol length (e.g., 4 μsec) in the OOK-modulated WUR part. Accordingly, a data rate in the data field of the WUR part may be 250 kbps. However, the present description is not limited to FIG. 14 and the data rate may be 62.5 kbps in the WUR data field.

Figure 15:
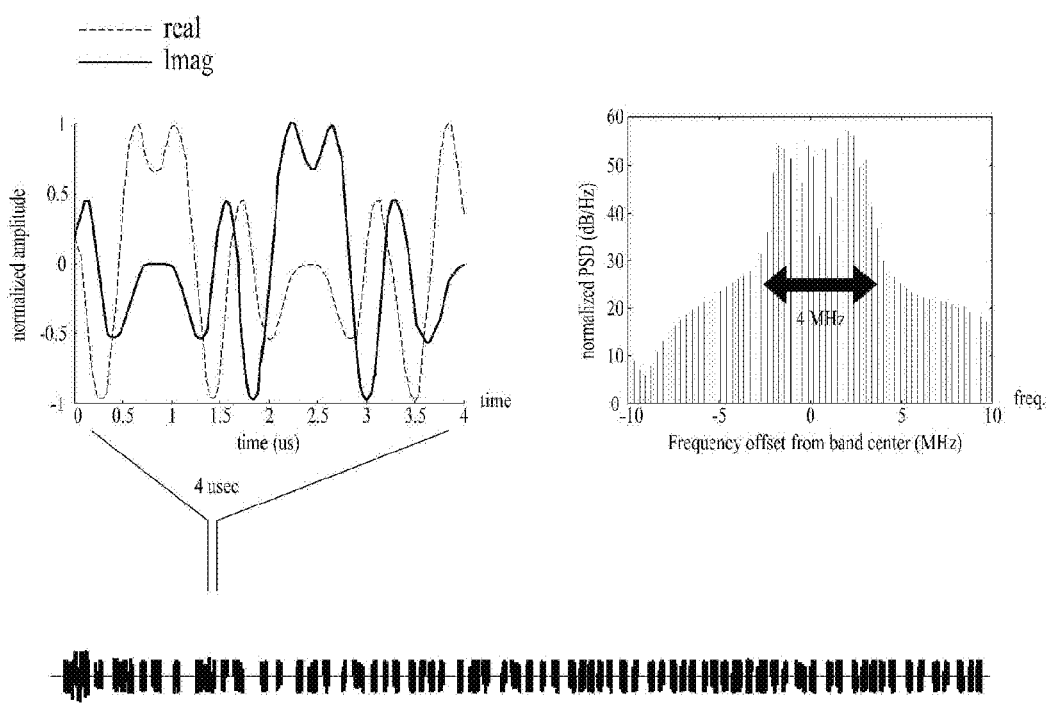
FIG. 15 is a diagram for explaining a WUR packet generated using an OFDM transmitter of a wireless LAN.

FIG. 15 is a diagram for explaining generation of a WUR packet using an OFDM transmitter of a wireless LAN. A phase shift keying (PSK)-OFDM transmission technique is used in wireless LANs. Generation of a WUR packet by adding an additional OOK modulator for OOK modulation increases transmitter implementation costs. Accordingly, a method for generating an OOK-modulated WUR packet by reusing an OFDM transmitter will be described.

According to OOK modulation, a bit value 1 is modulated into a symbol (i.e., on) having arbitrary power loaded thereon or having power equal to or higher than a threshold value and a bit value 0 is modulated into a symbol (i.e., off) having no power loaded thereon or having power equal to or less than the threshold value. The bit value 1 may be defined as power off.

In this manner, the bit value 1/0 is indicated through power on/off at a corresponding symbol position in the OOK modulation. Such a simple OOK modulation/demodulation method cam reduce power consumption for signal detection/demodulation of a receiver and costs for realizing the same. Furthermore, OOK modulation for signal on/off may be performed by reusing a legacy OFDM transmitter.

The left graph of FIG. 15 shows a real part and an imaginary part of a normalized amplitude for 1 symbol period (e.g., 4 μsec) with respect to a bit value 1 that has been OOK-modulated by reusing an OFDM transmitter of a legacy wireless LAN. An OOK modulation result with respect to a bit value 0 corresponds to power off and thus illustration thereof is omitted.

The right graph of FIG. 15 shows a normalized power spectral density (PSD) in the frequency domain with respect to a bit value 1 that has been OOK-modulated by reusing an OFDM transmitter of a legacy wireless LAN. For example, the center frequency of 4 MHz in the corresponding bandwidth can be used for WUR. Although it is assumed that WUR operates in the bandwidth of 4 MHz in FIG. 15, this is for convenience of description and other frequency bandwidths may be used. However, it is desirable that WUR operate in a bandwidth narrower than the operating bandwidth of PCR (e.g., legacy wireless LAN) for power saving.

It is assumed that a subcarrier width (e.g., subcarrier spacing) is 312.5 kHz and an OOK pulse bandwidth corresponds to 13 subcarriers in FIG. 15. The 13 subcarriers correspond to about 4 MHz (i.e., 4.06 MHz=13*312.5 kHz), as mentioned above. The center subcarrier in the 4 MHz bandwidth may be nulled.

When an input sequence of inverse fast Fourier transform (IFFT) is defined as s={13 subcarrier tone sequence} in a legacy OFDM transmitter, IFFT for the sequence s is performed such that $X_t$=IFFT(s) and then a cyclic prefix (CP) having a length of 0.8 μsec is attached thereto, a symbol length of about 4 μs is obtained.

The WUR packet may also be called a WUR signal, a WUR frame or a WUR PPDU.

The WUR packet may be a packet for broadcast/multicast (e.g., WUR beacon) or a packet for unicast (e.g., a packet for ending a WUR mode of a specific WUR STA and waking the specific WUR STA up).

Figure 16:
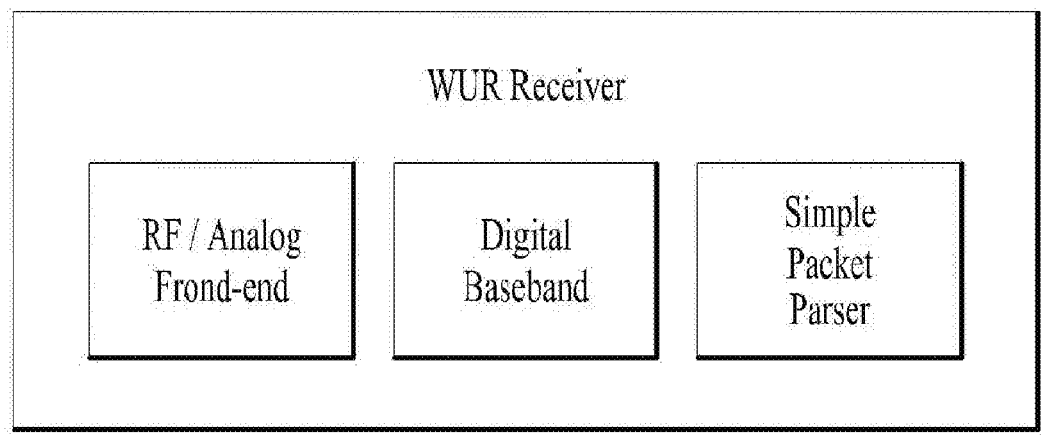
FIG. 16 illustrates a structure of a WUR receiver.

FIG. 16 illustrates a structure of a WUR receiver (WURx). Referring to FIG. 16, the WURx may include an RF/analog front-end, a digital baseband processor and a simple packet parser. FIG. 16 shows an exemplary configuration and the WUR receiver of the present description is not limited to FIG. 16.

Hereinafter, a WLAN STA including a WUR receiver is referred to as a simple WUR STA. A WUR STA may also be referred to as a simply STA.

Manchester coding based OOK modulation may be used for a WUR data field. The WUR data field can support multiple data rates (e.g., 62.5 kbps and 250 kbps). When Manchester coding is applied, a bit value 0 is represented as 2 μs ON symbol+2 μs OFF symbol and a bit value 1 is represented as 2 μs OFF symbol+2 μs ON symbol at 250 kbps. When Manchester coding is applied, a bit value 0 is represented as 4 μs ON symbol+4 μs OFF symbol+4 μs ON symbol+4 μs OFF symbol and a bit value 1 is represented as 4 μs OFF symbol+4 μs ON symbol+4 μs OFF symbol+4 μs ON symbol at 62.5 kbps.

In order for a WUR STA to ender a WUR mode, WUR mode signaling may be defined. For example, when explicit WUR mode signaling is used, WUR mode signaling may be performed through PCR and WUR operation parameters may be provided through WUR mode signaling. If an STA is in the WUR mode, the WURx of the STA can conform to a duty cycle schedule (including WURx always on) negotiated with an AP. If the STA is in the WUR mode, a service period previously negotiated between the AP and the STA with respect to PCR schedule TWT of the STA can be extended. When the service period is extended, the STA need not wake up for the service period and parameters of the negotiated service period are stored in the AP and the STA. If the STA is in the WUR mode and PCR of the STA is in a PS mode, the STA may not receive a PCR beacon frame.

A WUR action frame for WUR negotiation can be defined, and the WUR action frame includes a WUR identifier (WID) and may be transmitted through PCR. The WID uniquely identifies a WUR STA in a BSS of an AP. A WID included in a unicast wake-up frame identifies a receiver WUR STA.

An AP can used EDCA for WUR frame transmission. For example, the AP can transmit a WUR signal by reusing the legacy 4-access category (AC) and corresponding EDCA. The WUR signal may be, for example, a unicast wake-up packet, a multicast wake-up parameters packet, a broadcast wake-up packet or a WUR beacon but it is not limited thereto. The AP can use any AC for transmission of a WUR beacon or a multicast wake-up packet. If the AP does not have a buffered frame for an STA, the AP can use any AC for a unicast wake-up packet. After the AP transmits a WUR signal using EDCAF of a specific AC, the AP should not update reattempt counts of CW and AC. The AP should not update the reattempt counts of CW and AC when failure of a unicast wake-up packet transmitted using EDCACF of a specific AC is confirmed.

The AP transmits a unicast wake-up packet and then waits for the next timeout interval. When the AP has received any transmission from an STA for the timeout interval, wake-up packet transmission can be regarded as successful. On the other hand, when wake-up packet transmission fails, the AP retransmits the wake-up packet. The STA transmits a response frame to the AP through PCR after reception of the unicast wake-up packet.

To wake up a plurality of WUR mode STAs, a multi-user wake-up frame may be transmitted through a multicast/broadcast method. The AP may transmit a broadcast wake-up frame and then transmit a broadcast/multicast frame through PCR after a preparation period.

A WUR beacon frame may be periodically transmitted and a beacon interval may be indicated in a WUR mode element. The WUR mode element may be transmitted through PCR. The WUR beacon frame may include a partial timing synchronization function (TSF) for synchronization.

The AP may transmit a wake-up packet to STAs and then transmit a 11ax trigger frame for requesting response frames from the STAs.

Figure 17:
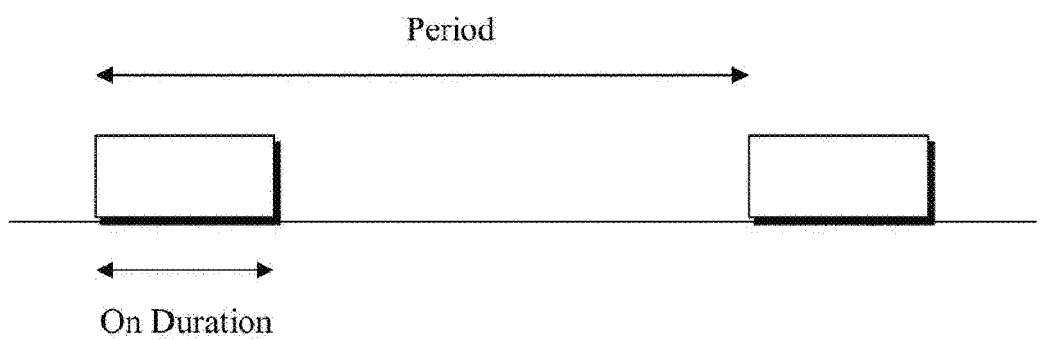
FIG. 17 is a diagram for explaining a WUR duty cycle mode.

FIG. 17 is a diagram for explaining a WUR duty cycle mode. A WUR receiver of an STA can operate in a duty cycle mode. A period of a WUR duty cycle may be a multiple of a basic unit and the basic unit may be indicated by an AP. An on duration is set to at least a minimum wake-up duration in each WUR duty cycle period. The minimum wake-up duration may be indicated by the AP. The AP may determine a start point of the WUR duty cycle.

Error Handling of Beacon Reception for System Information Update

An AP may transmit a wake-up frame (e.g., a broadcast wake-up frame) to STAs in a WUR mode (e.g., a WUR duty cycle mode) such that the WUR mode STAs update PCR system parameters. The STAs which have received the broadcast wake-up frame may wake up at a PCR beacon transmission timing, receive a PCR beacon and update system parameters. For convenience, a PCR beacon frame may also be referred to as simply a beacon.

When STAs fail to receive a PCR beacon frame for system parameter update, problems may be generated. For example, if an STA wakes up at a PCR beacon transmission timing and misses reception of a beacon, the STA can continuously wait a beacon frame while remaining in the PCR until the next beacon transmission timing. When the AP that does not know that the STA remains in the PCR from the wake-up timing until the next beacon transmission timing receives data directed to the STA for the corresponding period from the network, the AP can transmit a unicast wake-up frame to the STA. However, the STA cannot receive the unicast wake-up frame because it is not in a WUR mode and thus cannot transmit a response frame for the wake-up frame to the AP through the PCR. The AP retransmits the unicast wake-up frame because it has not received a response to the unicast wake-up frame within a fixed period after transmission of the unicast wake-up frame. This repeated unicast wake-up frame transmission of the AP causes channel congestion increase and PCR data frame transmission is delayed due to absence of a response of the STA.

Hereinafter, methods for solving problems generated when STAs fail to receive a PCR beacon frame for system parameter update will be proposed.

An AP and an STA may exchange parameters for WUR mode operation by performing a WUR negotiation procedure (e.g., the AP and the STA exchange a WUR negotiation request/response frames) before the STA enters a WUR mode.

Example 1

In the WUR negotiation procedure, the AP and STAs can negotiate first time information (e.g., a PCR stand-by period or a PCR stand-by duration) about a time for which the STAs that have received a broadcast wake-up frame should remain in the PCR from a beacon transmission timing. For convenience, the first time information is assumed to be the PCR stand-by period.

The AP that has transmitted a broadcast wake-up frame does not transmit a unicast wake-up frame to STAs for the negotiated period from the next target beacon transmission timing. However, the unicast wake-up frame can be exceptionally transmitted to STAs in a duty cycle mode which have not received the broadcast wake-up frame.

A WUR mode STA which has received the broadcast wake-up frame turns on the PCR to enter an awake state and then waits to receive a beacon from the next target beacon transmission timing. When the STA receives a beacon within the negotiated period, the STA can immediately return to the WUR mode.

If the STA does not receive a beacon within the negotiated period, the STA can enter the WUR mode when the negotiated period expires.

Example 2

In the WUR negotiation procedure, the AP and STAs can negotiate the first time information (e.g., a PCR stand-by period or a PCR stand-by duration) about a time for which STAs which have received a broadcast wake-up frame should remain in the PCR from a beacon transmission timing and second time information (e.g., a beacon reception period or a beacon reception duration) about a time for which STAs should wait for beacon reception before transmitting a frame indicating wake-up to the AP. For convenience, the first time information is assumed to be the PCR stand-by period and the second time information is assumed to be the beacon reception period.

When an STA has not received a beacon for the beacon reception period, the STA can transmit a PCR frame (e.g., a PS-poll frame or a QoS frame) indicating that the STA wakes up to the AP.

If the STA fails to transmit a PS-poll or QoS null frame within the PCR stand-by period (e.g., the STA fails to receive ACK after SIFS from PS-poll or QoS null frame transmission), the STA immediately enters the WUR mode after the PCR stand-by period.

If the STA successfully transmits a PS-poll or QoS null frame within the PCR stand-by period (e.g., the STA successfully receives ACK after SIFS from PS-poll or QoS null frame transmission), the STA can wait for beacon reception in the PCR without entering the WUR mode or enter a doze state until the next beacon transmission timing.

The AP that has received the PS-poll or QoS null frame does not transmit a unicast wake-up frame to the corresponding STA through WUR because the AP knows that the STA is in the PCR. If the STA remains in the awake state, the AP may transmit PCR data to the STA.

Example 3

Similarly to Example 2, in the WUR negotiation procedure, the AP and STAs can negotiate the first time information (e.g., a PCR stand-by period or a PCR stand-by duration) about a time for which STAs which have received a broadcast wake-up frame should remain in the PCR from a beacon transmission timing and the second time information (e.g., a beacon reception period or a beacon reception duration) about a time for which STAs should wait for beacon reception. For convenience, the first time information is assumed to be the PCR stand-by period and the second time information is assumed to be the beacon reception period.

When an STA has not received a beacon within the beacon reception period, the STA can transmit a system information request frame to the AP. For example, the system information request frame may be a unicast probe request frame or a new management/action request frame (e.g., system information request frame).

The AP that has received the system information request frame can transmit a system information response frame including system parameters requested by the STA to the STA. For example, the system information response frame may be a management/action frame (e.g., system information request frame).

An STA can include system parameter version information in the system information request frame and transmit the system information request frame in order to send a request for only system parameters necessary for the STA to the AP. The system parameter version information may be a check beacon field, an AP configuration change count or a change sequence, for example, but the present disclosure is not limited thereto.

The AP that has received the system information request frame including the system parameter version information can transmit a system information response frame including only change information to the STA in response to the system information request frame. The system information response frame may be an optimized probe response frame (e.g., 11ai), a compressed probe response frame (e.g., 11ah), a short probe response frame (e.g., 11ah) or a new management/action frame, for example, but the present disclosure is not limited thereto.

The methods described in Examples 1 to 3 are not limited to failure of beacon frame reception for system parameter update and may be equally applied when the AP transmits a broadcast wake-up frame in order to transmit broadcast data, a group addressed BU or a DTIM beacon through the PCR.

Figure 18:
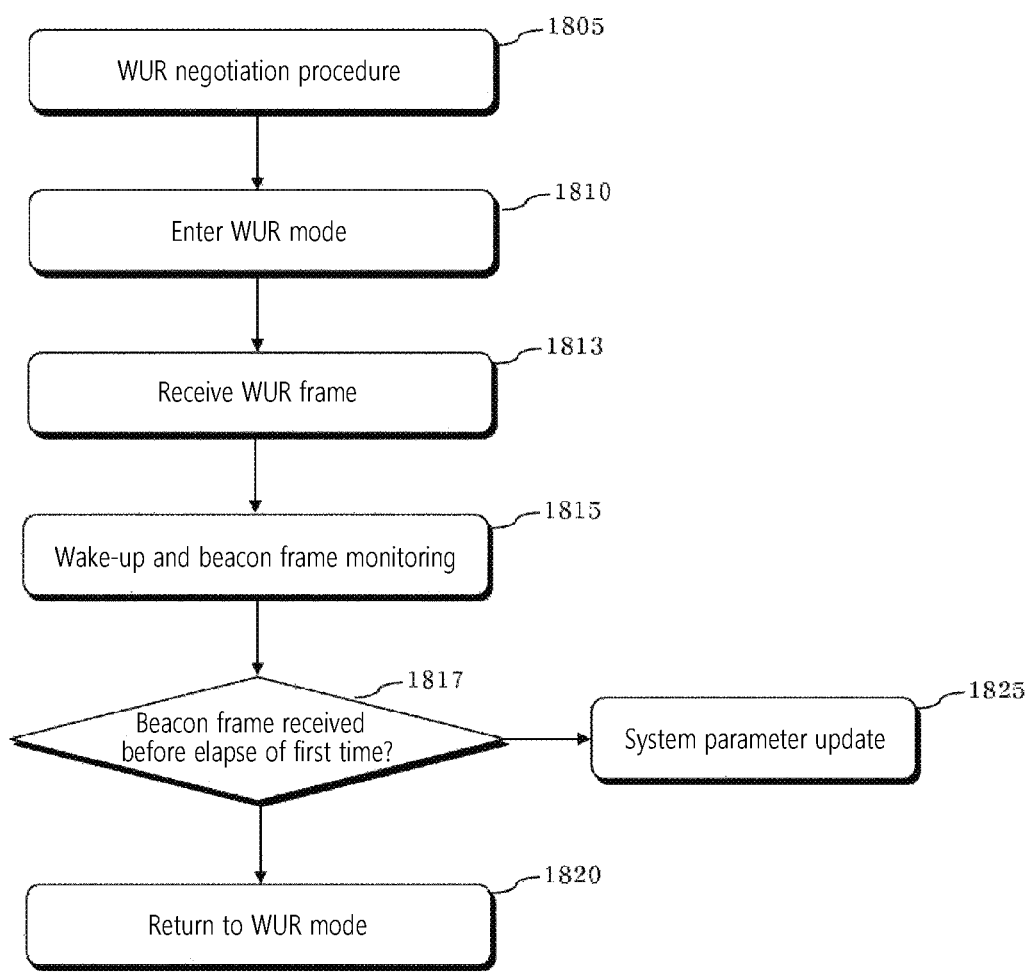
FIG. 18 illustrates a flow of a method for transmitting/receiving a frame according to an embodiment of the present disclosure.

FIG. 18 illustrates a flow of a method for transmitting/receiving a frame according to an embodiment of the present disclosure. FIG. 18 illustrates implementation of the above-described embodiments, and the present disclosure is not limited to FIG. 18 and redundant description may be omitted.

An STA can perform a WUR negotiation procedure through which the STA exchanges wake-up radio (WUR) operation parameters with an access point (AP) through primary connectivity radio (PCR) (1805). The WUR operation parameters exchanged through the WUR negotiation procedure may include first time information indicating a time for which the STA that has woke up after WUR frame reception should monitor a beacon frame from the next beacon transmission timing.

The STA returns to a WUR mode (1810).

When a WUR frame is received through the WUR (1813), the STA wakes up and monitors a beacon frame through the PCR from the next beacon transmission timing (1815). The WUR frame may be a broadcast wake-up frame for instructing the STA to wake up to receive the beacon frame.

The STA may return to the WUR mode when the beacon frame is not received until the time indicated by the first time information has elapsed (1820).

On the other hand, when the beacon frame is received before the elapse of the time indicated by the first time information, the STA may update PCR system parameters on the basis of the beacon frame (1825).

The WUR operation parameter exchanged through the WUR negotiation procedure may include second time information. The STA may transmit a PCR frame to the AP when a time indicated by the second time information has elapsed before the elapse of the time indicated by the first time information.

For example, the PCR frame may be a PS-poll frame or a QoS null frame that notifies the AP that the STA has woke up. When the STA has successfully transmitted the PCR frame, the STA may reattempt to receive the beacon frame without returning to the WUR mode even when the time indicated by the first time information has elapsed. The STA may determine that the PCR frame has been successfully transmitted when an ACK frame is received from the AP after a short inter-frame space (SIFS) from PCR frame transmission.

Alternatively, the PCR frame is a system parameter request frame for requesting PCR system parameters from the AP and may include version information of PCR system parameters of the STA.

Figure 19:
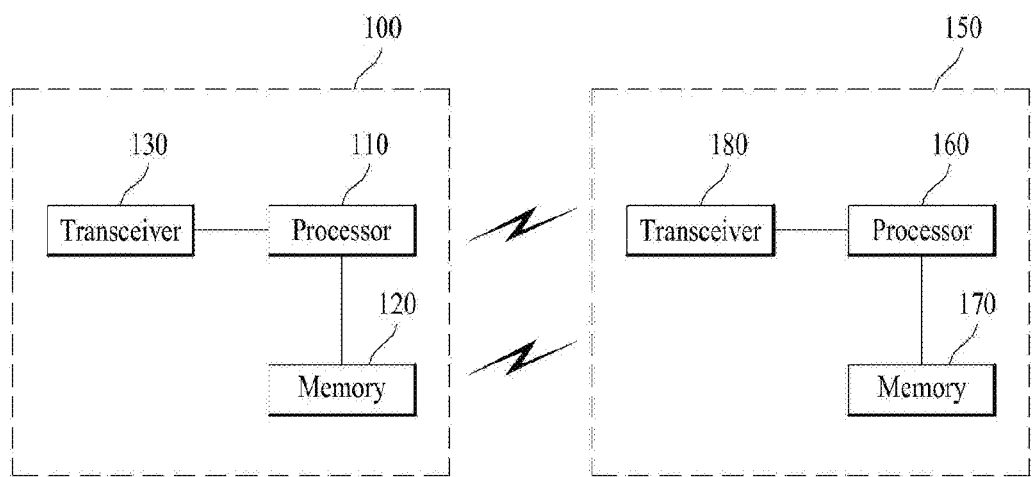
FIG. 19 is a diagram for explaining an apparatus according to an embodiment of the present disclosure.

FIG. 19 is a diagram for explaining an apparatus for realizing the above-described method.

A wireless apparatus 100 of FIG. 19 may correspond to the above-described specific STA and a wireless apparatus 150 may correspond to the above-described AP.

The STA 100 may include a processor 110, a memory 120 and a transceiver 130 and the AP 150 may include a processor 160, a memory 170 and a transceiver 180. The transceivers 130 and 180 may transmit/receive RF signals and may be executed in a physical layer of IEEE 802.11/3PP or the like. The processors 110 and 160 are executed in the physical layer and/or a MAC layer and connected to the transceivers 130 and 180.

The processors 110 and 160 and/or the transceivers 130 and 180 may include application-specific integrated circuits (ASICs), other chipsets, logic circuits and/or data processors. The memories 120 and 170 may include a read-only memory (ROM), a random access memory (RAM), a flash memory, a memory card, a storage medium and/or other storage units. When an embodiment is executed by software, the above-described method may be implemented as modules (e.g., processes and functions) which execute the above-described functions. The modules may be stored in the memories 120 and 170 and executed by the processors 110 and 160. The memories 120 and 170 may be provided inside or outside the processors 110 and 160 and connected to the processors 110 and 160 using known means.

The transceiver 130 of the STA may include a transmitter (not shown) and a receiver (not shown). The receiver of the STA may include a primary connectivity radio (PCR) receiver for receiving PCR (e.g., a WLAN such as IEEE 802.11 a/b/g/n/ac/ax) signals and a WUR receiver for receiving WUR signals. The transmitter of the STA may include a PCR transmitter for transmitting PCR signals.

The transceiver 180 of the AP may include a transmitter (not shown) and a receiver (not shown). The transmitter of the AP may correspond to an OFDM transmitter. The AP may transmit a WUR payload according to OOK by reusing an OFDM transmitter. For example, the AP may OOK-modulate the WUR payload through the OFDM transmitter, as described above.

The detailed description of the preferred embodiments of the present disclosure has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

The present disclosure can be applied to various wireless communication systems including IEEE 802.11.

What is claimed is:

1. A method for receiving a frame in a wireless Local Area Network (WLAN), the method comprising:
obtaining, by a station (STA) that includes a primary connectivity radio (PCR) and a wake-up radio (WUR), information related to a next beacon transmission timing from an access point (AP), wherein the STA supports a PCR mode in which a PCR frame is received through the PCR of the STA and a WUR mode in which a WUR frame is transmitted and received through the WUR of the STA, wherein the WUR frame includes a preamble part followed by a WUR part which is modulated based on on-off keying (OOK) scheme;
performing, by the STA, a WUR negotiation procedure in the PCR mode for exchanging WUR operation parameters with the AP, wherein first time information related to a first time period and second time information related to a second time period are obtained by the STA during the WUR negotiation procedure;
entering, by the STA, the WUR mode from the PCR mode after performing the WUR negotiation procedure; and
entering, by the STA, the PCR mode from the WUR mode based on receiving a wake-up frame through the WUR of the STA, and monitoring, by the STA, a PCR beacon frame through the PCR of the STA from the next beacon transmission timing during the first time period,
wherein the STA determines whether to enter the WUR mode after monitoring the PCR beacon frame during the first time period based on whether the STA successfully transmits a response to the PCR beacon frame within the first time period from the next beacon transmission timing, and the response to the PCR beacon frame includes a power save (PS) poll frame or a Quality of Service (QoS) null frame, and
wherein the STA determines whether to transmit a Probe Request frame during the first time period through the PCR of the STA to request system information from the AP based on whether the PCR beacon frame is received within the second time period from the next beacon transmission timing.

2. The method of claim 1, wherein based on the STA failing to transmit the response to the PCR beacon within the first time period from the next beacon transmission timing, the STA determines to enter the WUR mode immediately after monitoring the PCR beacon frame during the first time period.

3. The method of claim 1, wherein based on the STA successfully transmitting the response to the PCR beacon within the first time period from the next beacon transmission timing, the STA determines to remain in the PCR mode after monitoring the PCR beacon frame during the first time period.

4. The method of claim 1, wherein the preamble part includes a legacy-short training field (L-STF) which is followed by a legacy-long training field (L-LTF) which is followed by a legacy-signal (L-SIG) which is followed by a single Binary Phase Shift Keying (BPSK) symbol.

5. The method of claim 4, wherein the WUR part is contiguous to the single BPSK symbol.

6. A station (STA) configured to operate in a wireless Local Area Network (WLAN), the STA comprising:
a primary connectivity radio (PCR) configured to transmit and receive a PCR frame;
a wake-up radio (WUR) configured to receive a WUR frame, wherein the WUR frame includes a preamble part followed by a WUR part which is modulated based on on-off keying (OOK) scheme; and
a processor configured to support a PCR mode in which the PCR frame is received through the PCR and a WUR mode in which the WUR frame is transmitted and received through the WUR, wherein the processor is further configured to:
obtain information related to a next beacon transmission timing from an access point (AP),
perform a WUR negotiation procedure in the PCR mode for exchanging WUR operation parameters with the AP, wherein first time information related to a first time period and second time information related to a second time period are obtained by the processor during the WUR negotiation procedure;

enter the WUR mode from the PCR mode after performing the WUR negotiation procedure; and enter the PCR mode from the WUR mode based on receiving a wake-up frame through the WUR, and monitor a PCR beacon frame through the PCR from the next beacon transmission timing during the first time period, wherein the processor is further configured to determine whether to enter the WUR mode after monitoring the PCR beacon frame during the first time period based on whether the processor successfully transmits a response to the PCR beacon frame within the first time period from the next beacon transmission timing, and the response to the PCR beacon frame includes a power save (PS) poll frame or a Quality of Service (QoS) null frame, and wherein the processor is further configured to determine whether to transmit a Probe Request frame during the first time period through the PCR to request system information from the AP based on whether the PCR beacon frame is received within the second time period from the next beacon transmission timing.

7. The STA of claim 6, wherein the processor is further configured to:

based on the STA failing to transmit the response to the PCR beacon within the first time period from the next beacon transmission timing, determine to enter the WUR mode immediately after monitoring the PCR beacon frame during the first time period.

8. The STA of claim 6, wherein the processor is further configured to:

based on the STA successfully transmitting the response to the PCR beacon within the first time period from the next beacon transmission timing, determine to remain in the PCR mode after monitoring the PCR beacon frame during the first time period.

9. The STA of claim 6, wherein the preamble part includes a legacy-short training field (L-STF) which is followed by a legacy-long training field (L-LTF) which is followed by a legacy-signal (L-SIG) which is followed by a single Binary Phase Shift Keying (BPSK) symbol.

10. The STA of claim 9, wherein the WUR part is contiguous to the single BPSK symbol.

* * * * *